United States Patent [19]
Chrin

[11] Patent Number: 4,577,287
[45] Date of Patent: Mar. 18, 1986

[54] METHOD AND APPARATUS FOR GENERATING DIGITAL SIGNALS REPRESENTING PERIODIC SAMPLES OF A SINE WAVE

[75] Inventor: Christopher J. Chrin, Lisle, Ill.

[73] Assignee: AT&T Bell Laboratories, Murray Hill, N.J.

[21] Appl. No.: 471,330

[22] Filed: Mar. 2, 1983

[51] Int. Cl.$^4$ .............................................. G06F 15/31
[52] U.S. Cl. ................................................... 364/721
[58] Field of Search .................. 364/721, 817; 328/14, 328/142, 178

[56] References Cited

U.S. PATENT DOCUMENTS

| | | | |
|---|---|---|---|
| 3,649,821 | 3/1972 | Gumacos | 364/721 |
| 3,679,881 | 7/1972 | Gondeck | 364/721 |
| 4,135,422 | 1/1979 | Chibana | 364/721 |
| 4,159,526 | 6/1979 | Mosley, Jr. et al. | 364/721 |
| 4,172,286 | 10/1979 | Wess | 364/721 |
| 4,285,044 | 8/1981 | Thomas et al. | 364/721 |
| 4,438,503 | 3/1984 | White et al. | 364/721 |

OTHER PUBLICATIONS

Inose, *An Introduction to Digital Integrated Communication Systems*, University of Tokyo Press, 1979, pp. 1-8.
S. M. Silverston, "A Stable, Two Multiplies-per-Cycle Algorithm for Digital Generation of Sinusoids in Real Time," IEEE Transactions on Computers, vol. C-26, No. 11, pp. 1153-1154, Nov. 1977.
L. R. Rabiner and B. Gold, *Theory and Application of Digital Signal Processing*, Prentice-Hall, 1975, pp. 563-564.

*Primary Examiner*—David H. Malzahn
*Attorney, Agent, or Firm*—Peter Visserman

[57] ABSTRACT

A method of generating the digital representation of a sine wave. A digital signal processor is used to generate the sample digital values, spaced at period T, of a sine wave of frequency F, using the value of the previous sample, e, the corresponding value of cosine, f, and two constants, $c = \sin 2\pi FT$ and $d = \cos 2\pi FT$. The next value of sine, $S = ed + cf$; the value of the corresponding cosine, $C = df - ce$. The magnitude of c and d are rounded up so that $c^2 + d^2 \geq 1$. Any calculated values of S or C which exceed unity in magnitude are limited to a magnitude of unity. This limiting operation accomplishes the normalization operation necessary to avoid exponential build-up due to accumulated round-off errors, and does so more efficiently than was previously possible. Sine waves with a 50 dB signal to noise ratio have been generated using this method.

13 Claims, 6 Drawing Figures

METHOD AND APPARATUS FOR GENERATING DIGITAL SIGNALS REPRESENTING PERIODIC SAMPLES OF A SINE WAVE

TECHNICAL FIELD

This invention relates to digital signal processing and, more specifically, to the digital generation of sine wave signals.

BACKGROUND OF THE INVENTION

Heretofore, sine waves have been generated with digital circuitry either by direct read-out of values stored in a memory unit or by a digital signal processor generating the sequential values of the sine wave using an interpolative process. Each successive value, sin $(a+b)$, of the sine wave can be calculated from the previous value, sin $a$, using the well-known trigonometric formulae:

$$\sin(a+b) = \sin a \cos b + \cos a \sin b \qquad (1)$$

$$\cos(a+b) = \cos a \cos b - \sin a \sin b, \qquad (2)$$

$b = 2\pi FT$, T is the desired or tolerable granularity (period between successive intervals) and F is the frequency of the sine wave. The calculating procedure suffers from the accumulation of round-off errors leading eventually to the generation of an exponentially increasing or decreasing sine wave.

U.S. Pat. No. 4,285,044, L. Thomas et al., issued Aug. 18, 1981, proposed that round-off error accumulation could be moderated by the use of rather elaborate circuitry for calculating the quantity $1 + [1 - \cos^2(a+b) - \sin^2(a+b)]/2$ and using the calculated quantity as an approximation for a root-mean-square normalization to insure that the value of the generated $\cos^2(a+b) + \sin^2(a+b)$ signal would initially converge to 1 and subsequently remain at approximately 1. The Thomas patent normalizing factor circuitry prevents exponential build-up or exponential decay of the calculated values of the sine wave and the corresponding cosine function. A less complex arrangement for avoiding exponential build-up or decay problem in a digital sine wave generator would clearly be attractive. It would also be advantageous to permit a given digital signal processor system to generate more sine waves or generate more frequent samples of a sine wave and thereby achieve finer granularity in the output wave.

SUMMARY OF THE INVENTION

A digital sine wave of frequency F is generated as having a specified granularity, T, less than $1/2F$, by circuitry for generating the present value of signal sample amplitude using the value generated for the previous sample of the sine wave signal, the value of the corresponding cosine function, and two control signals $c = \sin 2\pi FT$ and $d = \cos 2\pi FT$. The normalizing required to avoid exponential build-up of the output signal is accomplished by limiting the generated output calculated value of both sine and cosine signals to a magnitude of one. The amplitude of the control signals c and d are rounded up in absolute value to insure that $c^2 + d^2 \geq 1$. The limiting of calculated sine and cosine signal amplitudes to unity avoids exponential signal build-up resulting from accumulated round-off errors; the rounding-up of the control signals avoids exponential decay resulting from accumulated round-off errors.

In accordance with one aspect of the invention, the formulas used for calculating $\sin 2\pi F(a+T)$, the next value of a sample, using the previous values of the sample $\sin 2\pi Fa$, the value of the corresponding cosine function, $\cos 2\pi Fa$, and the two constants, c and d, are as follows:

$$\sin 2\pi F(a+T) = d \sin 2\pi Fa + c \cos 2\pi Fa$$

$$\cos 2\pi F(a+T) = d \cos 2\pi Fa - c \sin 2\pi Fa$$

In a system in accordance with this invention, initial values of sine and cosine signal amplitudes are needed. In accordance with one embodiment of this invention, these initial values for sine and cosine signals are set to zero and one, respectively.

In accordance with one aspect of the invention normalizing is accomplished on the signal generated at a base of unity level and when an output having a sine wave maximum amplitude of "A" is required by the user, the amplitude of the digital sine wave so generated is then scaled by multiplying each calculated value by the appropriate amplitude scaling factor prior to transmission to a user. Alternatively, normalization could be accomplished by starting with values 0 and A for the sine and cosine signals, and limiting the magnitude of all calculated sine values and corresponding cosine values to A.

In one embodiment of the invention, a digital signal processor capable of generating several digital sine waves at the same time is employed since the required data processing load for generating each sample is sufficiently small that samples for several sine waves may be generated in one interval T. In accordance with one aspect of the invention, the output of this digital signal processor is transmitted to a digital to analog converter whose output when filtered is a sinusoidally varying electrical signal. Advantageously, in a system requiring the concurrent generation of a plurality of sine waves, fewer digital signal processors are required to carry out this function.

In accordance with one specific embodiment of this invention, if digital sine waves of only a limited number of frequencies are required of a digital signal processor, the constants c and d can be precalculated and stored in memory.

In accordance with an alternate embodiment of this invention for generating sine waves where $1/2T$ is much less than F, the value of d is set to 1. Advantageously, this approach reduces the number of multiplications required to calculate each sample.

BRIEF DESCRIPTION OF THE DRAWING

A more complete understanding of the present invention may be obtained from a consideration of the following description when read in conjunction with the drawing, in which.

GENERAL DESCRIPTION OF THE PRIOR ART

Figure 1:
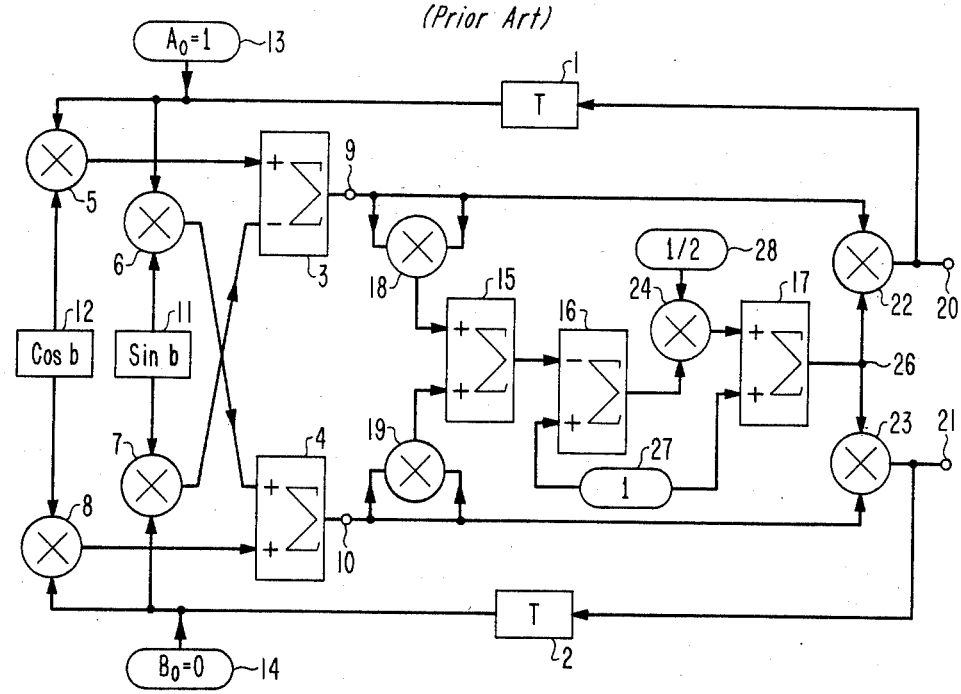
FIG. 1 is a block diagram of a prior art digital sine wave generator.
Figure 2:
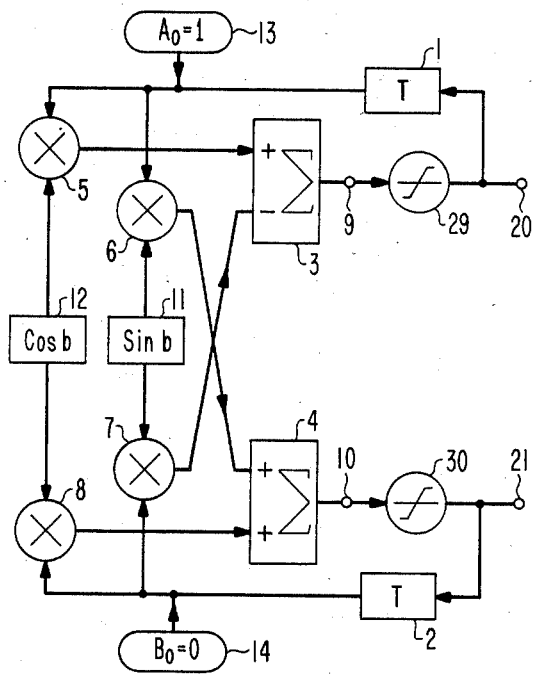
FIG. 2 is a block diagram of a digital sine wave generator in accordance with the principles of this invention.

FIG. 1 is a copy of FIG. 2 of U.S. Pat. No. 4,285,044, L. Thomas et al. issued Aug. 18, 1982, changed only to conform to the notation of the present description, i.e., sin $\phi$ and cos $\phi$ have been changed to sin b and cos b. Boxes 11 and 12, labeled sin b and cos b, generate sin b and cos b, and outputs 21 and 20 provide, respectively, the current value of sin a and cos a. These values are delayed by one unit of time (corresponding to T, the "granularity" or interval between successively calculated values of the sine wave) by the two boxes numbered 1 and 2, each labeled T, and used as inputs to multipliers 5 and 6, and multipliers 7 and 8, respectively. The outputs of these multipliers are fed into adders 3 and 4 whose outputs 9 and 10 represent cos (a+b) and sin (a+b), respectively.

The complex consisting of multipliers 18, 19, and 24 and adders 15, 16, and 17, in conjunction with unit generator 27 and ½ unit generator 28, are used to calculate the quality $1+[1-\cos^2 (a+b)_2-\sin^2 (a+b)]/2$. This quantity is an approximation for $$\frac{1}{\sqrt{\cos^2(a + b) + \sin^2(a + b)}}$$

if $\cos^2 (a+b)+\sin^2 (a+b)$ is close to unity. The approximation quantity is a normalizing factor used to insure that the value of $\cos^2 (a+b)+\sin^2 (a+b)$ initially converges to 1 and subsequently remains approximately 1. This normalizing factor is used as a factor to multiply via units 22 and 23 the calculated unnormalized values of cos (a+b) and sin (a+b) prior to their use by the outside system and prior to their use for calculating the next value of sine and cosine. The Thomas patent normalizing factor prevents exponential build-up or exponential decay of the calculated values of the sine wave and the corresponding cosine function.

DETAILED DESCRIPTION

Two embodiments of the invention are described below in more detail with reference to the block diagrams of FIGS. 2 and 4 respectively. FIG. 2 shows a digital sine wave generator in accordance with the invention in which the normalizing function is performed by blocks 29 and 30. Note that FIG. 2 is adapted from FIG. 1, the prior art, by eliminating blocks 15, 16, 17, 18, 19, 22, 23, 24, 27, and 28, and adding blocks 29 and 30. Blocks 29 and 30 are limiter circuits which convert all signals whose amplitude exceeds 1 to signal having the same sign, but with magnitude 1. Limiter circuits 29 and 30 do not, however, change the values of any input signal having an amplitude between plus and minus one. Circuits 29 and 30, accordingly, function to normalize the signal applied at their inputs whenever either the generated cosine or sine signal value exceeds 1. Normalization does not change the output of every generated signal value as in the cited Thomas et al. patent, but only changes the generated sine or cosine signal values which exceed 1. Thus, the circuit shown in FIG. 2 performs the basic calculations required to generate a next value of sine and cosine signal and, through limiter circuits 29 and 30, performs the normalization required to prevent exponential build-up. So that the generated sine wave will not suffer from exponential decay modulation, the values of the generated sin b and cos b signals must be rounded up in absolute value so that $\sin^2 b+\cos^2 b \geq 1$.

Figure 3:
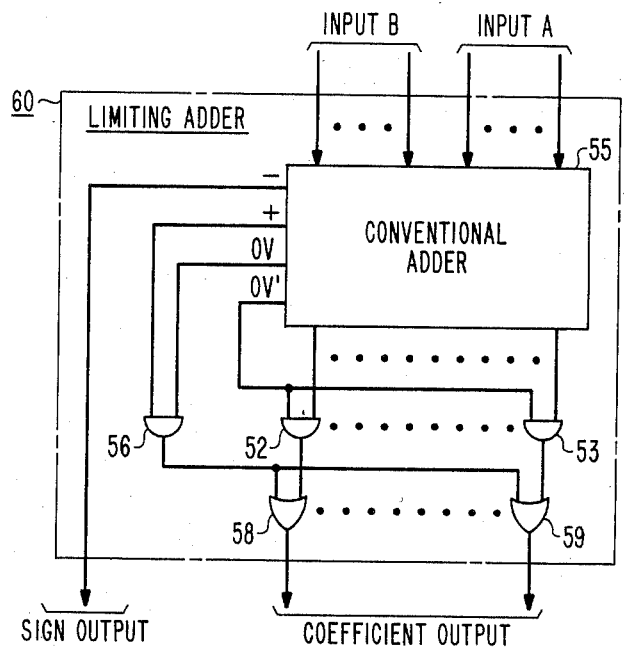
FIG. 3 is a block diagram of a limiting adder employed in the illustrative embodiment.

Circuitry for performing the combination of functions of summer 3 and circuit 29 of FIG. 2 is shown in FIG. 3 by limiting adder circuit 60 which has the same inputs as summer 3 and which provides the output of limiter 29. Gates 52, . . . ,53 are AND gates which gate the sum generated by conventional 2's complement adder 55 to the output via OR gates 58, . . . ,59 in the absence of overflow (OV'). When an overflow signal OV is present together with the "+" sign signal, AND gate 56 is enabled to apply a 1 output to all of OR gates 58, . . . ,59. The "+" sign signal together with an overflow indication OV produces the fractional approximation of +1 in 2's complement arithmetic (011 . . . 1). When the overflow signal OV and the "−" sign are both present, the OV' signal is low and blocks AND gates 52, . . . ,53 and so causes a 0 output for all of the coefficient output leads. The sign lead, however, is present. Thus, "−1, " represented as the output signal pattern and 100 . . . 0, is generated whenever there is an overflow with a negative sign. The output of limiting adder 60 of FIG. 3 is, accordingly, the limited sum output of limiter 3 of FIG. 2. Such limiting adder functions can be readily achieved by basic program steps in commercially available digital signal processors such as the American Microsystems Inc. AMI S2811.

Figure 4:
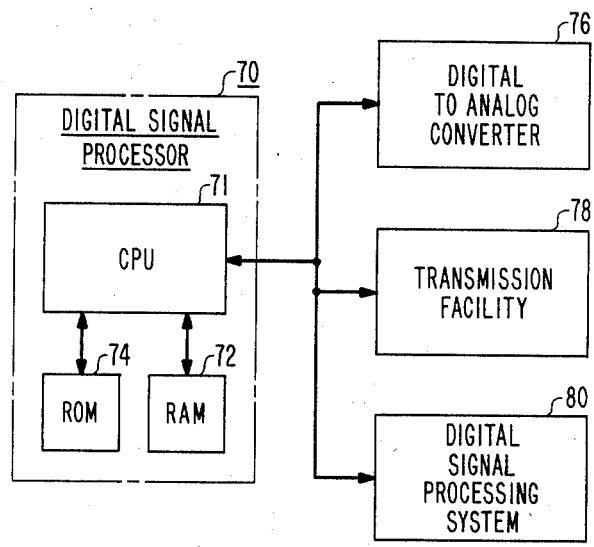
FIG. 4 is a block diagram of a signal processor, an analog to digital converter, a transmission facility, and a signal processing system.

FIG. 4 shows a commercially available (AMI S2811) digital signal processor 70 including central processing unit 71, random access read/write memory 72, and read-only memory 74. Where a particular application requires the generation of only a limited number of possible digital sine waves, for example, a transceiver for transmitting telephone numbers in the form of a pair of selected tones, only six different frequencies need to be generated. The values of sin $2\pi FT$ and cos $2\pi FT$ for these six frequencies can advantageously be stored in read-only memory 74. Read only memory 74 is also used for storing the FIG. 5 alternative embodiment program for generating the digital sine waves of the invention. The digital output signals provided by digital signal processor 70 are applied to digital to analog converter 76 which generates an analog sine wave signal from the digital sine wave. In addition, the output of signal processor 70 may be delivered to transmission facility 78 for utilization by remote user device (not shown).

Figure 5:
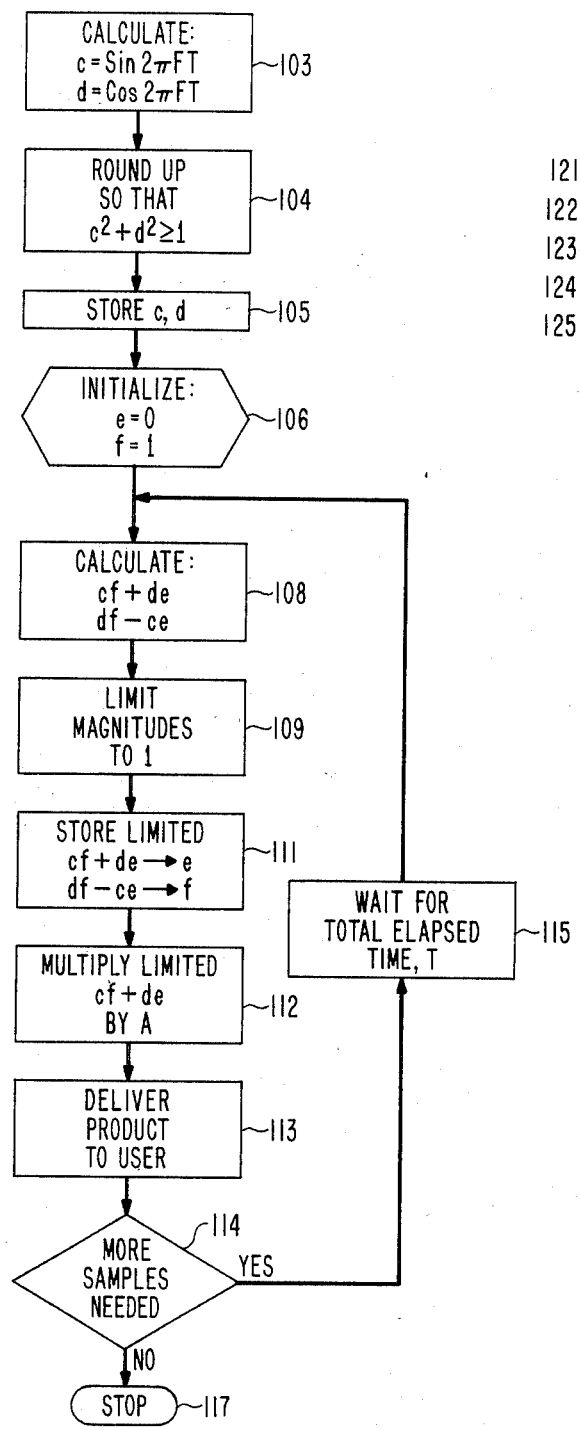
FIG. 5 is a flow diagram of a program for use in a digital signal processor for calculating successive values of a sine wave.
Figure 6:
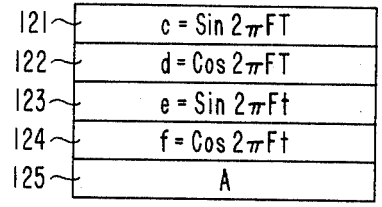
FIG. 6 is a layout diagram of memory used for storing constants and calculated values of sine and cosine.

FIG. 5 is a flow diagram of a program used in an alternative embodiment employing the digital processor 70 of FIG. 4 for generating successive values of a sine wave using the principles of this invention. FIG. 6 is a memory layout diagram of memory used to store constants and values. Process 103 of FIG. 5 performs the initial calculation of the magnitudes of signal sin $2\pi FT$ and cos $2\pi FT$. These values can be calculated using conventional numerical analysis methods well known in the prior art or can be calculated from a limited look-up table stored in memory 74, plus any necessary extrapolation. Process 104 rounds-up the initial value as calculated by process 103 so that the sum of the squares of the calculated sine and cosine values will equal or exceed 1. Process 105 stores the rounded-up values c and d in location 121 and 122 of FIG. 6. If, as in the case of a transceiver application discussed in the background of the invention, only a few values of c and d are needed, locations 121 and 122 may advantageously be in read-only memory 74. Process 106 stores in locations 123 and 124 the initial values e and f of the sine and cosine signals to be generated. Convenient initial values are 0 for e and +1 or −1 for f.

Processes 108, 109, 111, 112, 113, 114, and 115 are the basic processes for iteratively generating the values of the sine and cosine signal outputs. Process 108 generates the sine and cosine functions and calculates the value of (cf+de) and df−ce). Process 109 limits any value whose magnitude or absolute value exceeds 1 to a magnitude of 1. Process 111 replaces the e and f values with the limited values of sine and cosine as generated in block 109 in memory locations 123 and 124 (FIG. 6), respectively. Process 112, multiplies the limited value of sine by A, the amplitude of the required output signal stored in memory location 125. Output process 113 delivers the output to the user. Process 114, tests whether the generation of the sine wave should be continued. If so, process 115 performs an optional wait to allow a total time of T, the interval between successive samples of the sine wave, to elapse. Note that the time required to perform processes 108, 109, 111, 112, 113, and 114 is relatively fixed so that there normally will be no need to wait for additional elapsed time. The value of T can be made as small as may be appropriate to the needs of the user.

If a digital sine wave of amplitude A is required, an alternative approach is to set e and f initially to 0 and A, and to limit the magnitude of all subsequently calculated vaues of e and f to A. The multiplication by A (process 112) is then not required.

A digital sine wave generator using the principles of this invention has been implemented using 16-bit quantities for c and d, stored in read only memory 74, and 20-bit quantities for e and f, and using full 40 bit accumulator (not shown) of CPU 71. The generated digital sine wave when fed to digital to analog converter 76 resulted in an analog sine wave signal with a signal to noise ratio of about 50 dB. A digital to analog converter 76 similar to the commercially available AMI S3506/3507 single chip combination Codec was used. Greater precision is available by the use of longer binary quantities and the use of a higher quality digital to analog converter.

It should be apparent that the CORDIC and modified CORDIC formulas described in S. M. Silverstein: *A Stable, Two-Multiples-Per-Cycle Algorithm for Digital Generation of Sinusoids in Real Time*, IEEE Transactions on Computers, V. C-26, No. 11, November, 1977, pp. 1153–1154 may be used to calculate successive values in accordance with my invention. In the CORDIC formula, d is set to 1 so that the value of sine is cf+e and of cosine, f−ce. This formula can be used where cos $2\pi FT$ is fairly close to one, i.e., where T is much less than 1/2F. The distortion of the generated digital sine wave will be greater if this approximation is used than if a more exact value of cos $2\pi FT$ is used. The frequency generated will also be slightly lower than implied by the value of sin $2\pi FT$. The use of the CORDIC formula, where appropriate, reduces the number of multiplications required to generate the sine wave and corresponding cosine values.

It is to be understood that the above-described embodiment is merely illustrative of the principles of this invention; other arrangements may be devised by those skilled in the art without departing from the spirit and scope of the invention.

What is claimed is:

1. A method of generating electrical digital signals representing periodic sample values for a sine wave, the period of sample generation being T seconds, the frequency of said sine wave being F, T being less than 1/2F, comprising the steps of:
   (a) generating electrical signals representing initial values of c and d, c=sin $2\pi FT$, d=cos $2\pi FT$, rounded up in absolute value such that $c^2+d^2 \geq 1$;
   (b) generating electrical signals representing an initial value, e, of said sine wave, and f, the value of cosine corresponding to e;
   (c) generating a preliminary next value, S', of said sine wave by calculating cf+de=S', and generating a cosine value, C', corresponding to S', by calculating df−ce=C';
   (d) generating a final next value S of said sine wave and C of the corresponding cosine value, respectively, by limiting to one any magnitude of S' and C' respectively, which exceeds one;
   (e) setting e=S, f=C;
   (f) transmitting an electrical signal representing the value of S to a user of said signal; and
   (g) repeating steps c, d, e and f every T seconds for the duration of the time of generation of said digital sine wave.

2. A method of generating electrical digital signals representing periodic sample values for a sine wave, the period of sample generation being T seconds, the frequency of said sine wave being F, T being less than 1/2F, comprising the steps of:
   (a) generating electrical signals representing initial values of c and d, c=sin $2\pi FT$, d=cos $2\pi FT$, rounded up in absolute value such that $c^2+d^2 \geq 1$;
   (b) generating electrical signals representing an initial value, e, of said sine wave, and f, the value of cosine corresponding to e;
   (c) generating a preliminary next value, S', of said sine wave, and a cosine value, C', corresponding to S', from the values of c, d, e, and f;
   (d) generating a final next value S of said sine wave and C of the corresponding cosine value, respectively, by limiting to one any magnitude of S' and C' respectively, which exceeds one;
   (e) setting e=S, f=C;
   (f) transmitting an electrical signal representing the value of S to a user of said signal; and
   (g) repeating steps c, d, e and f every T seconds for the duration of the time of generation of said digital sine wave.

3. The method of claim 2 in which said initial values of e and f generated in step b have a magnitude of 0 to 1 respectively.

4. The invention of claim 2 in which said method is accomplished using a digital signal processor.

5. A method of generating electrical digital signals representing periodic sample values for a sine wave, the period of sample generation being T seconds, the frequency of said sine wave being F, T being less than 1/2F, comprising the steps of:
   (a) generating electrical signals representing initial values of c and d, c=sin $2\pi FT$, d=cos $2\pi FT$, rounded up in absolute value such that $c^2+d^2 \geq 1$;
   (b) generating electrical signals representing an initial value, e, of said sine wave, and f, the value of cosine corresponding to e;

(c) generating a preliminary next value, S', of said sine wave and a cosine value, C', corresponding to S', from the values of c, d, e, and f;

(d) generating a final next value S of said sine wave and C of the corresponding cosine value respectively, by limiting to one any magnitude of S' and C' respectively, which exceeds one;

(e) setting e=S, f=C;

(f) multiplying said value S by a constant A to generate a value SA representing the desired magnitude of said digital sine wave required by a user;

(g) transmitting an electrical signal representing the value of SA to a user of said signal; and (h) repeating steps c, d, e, f, and g for the duration of time of generation of said digital sine wave.

6. The invention of claim 4 in which step b comprises the steps of:

storing a group of m initial values of $c_i = \sin 2\pi F_i T$ and of $d_{i=\cos} 2\pi F_i T$ for m values of $F_i$, i representing an integer between 1 and m, such that $c_i^2 + d_i^2 \geq 1$ for every value of i; and selecting $c_a$ and $d_a$ in response to a request from a user for a sine wave of frequency $F_a$ where a is an integer between 1 and m.

7. A method of generating electrical digital signals representing periodic sample values for a sine wave, the period of sample generation being T seconds, the frequency of said sine wave being approximately F, T being much less than 1/2F, comprising the steps of:

(a) generating electrical signals representing an initial value of c, $c = \sin 2\pi FT$;

(b) generating electrical signals representing an initial value, e, of said sine wave, and f, the value of cosine corresponding to e;

(c) generating a preliminary next value, S', of said sine wave by calculating $cf + e = S'$ and generating a cosine value C' corresponding to S' by calculating $f - ce = C'$;

(d) generating a final next value S of said sine wave and C of the corresponding cosine value, respectively, by limiting to one any magnitude of S' and C' respectively, which exceeds one;

(e) setting e=S, f=C;

(f) transmitting an electrical signal representing the value of S to a user of said signal; and (g) repeating steps c, d, e and f every T seconds for the duration of the time of generation of said digital sine wave.

8. A method of generating electrical digital signals representing periodic sample values for a sine wave of amplitude A, the period of sample generation being T seconds, the frequency of said sine wave being F, T being less that 1/2F, comprising the steps of:

(a) generating electrical signals representing initial values of c and d, $c = \sin 2\pi FT$, $d = \cos 2\pi FT$, rounded up such that $c^2 + d^2 \geq 1$;

(b) generating electrical signals representing an initial value, e, of said sine wave, and f, the value of cosine corresponding to e, such that $e^2 + f^2$ is approximately $A^2$;

(c) generating a preliminary next value, S', of said sine wave, and a cosine value, C', corresponding to S', from the values of c, d, e, and f;

(d) generating a final next value S of said sine wave and C of the corresponding cosine value, respectively, by limiting to A any magnitude of S' and C' respectively, which exceeds A;

(e) setting e=S, f=C;

(f) transmitting an electrical signal representing the value of S to a user of said signal; and (g) repeating steps c, d, e and f every T seconds for the duration of the time of generation of said digital sine wave.

9. A method of generating an electrical signal varying sinusoidally with frequency F, comprising the steps of:

(a) generating a clock with period T, T being less than 1/2F;

(b) generating signals representing initial values of c and d, $c = \sin 2\pi FT$, $d = \cos 2\pi FT$, rounded up in absolute value such that $c^2 + d^2 \geq 1$;

(c) generating signals representing an initial value, e, of said sine wave, and f, the value of cosine corresponding to e;

(d) generating a preliminary next value S', of said sine wave, and a cosine value, C', corresponding to S', from the values of c, d, e, and f;

(e) generating a final next value S of said sine wave and C of the corresponding cosine value, respectively, by limiting to one any magnitude of S' and C' respectively, which exceeds one;

(f) setting e=S, f=C;

(g) transmitting a signal representing the value of S to a digital to analog converter having an input, wherein said output of said digital to analog converter is said electrical signal; and (h) repeating steps d, e, f, and g every T seconds for the duration of the time of said electrical signal.

10. A digital sine wave oscillator for generating a signal representing the consecutive sample digital values of a sine wave of frequency F, the period between consecutive sample values being T seconds where T is less than 1/2F, comprising:

initialization means for deriving values $c = \sin 2\pi FT$, $d = \cos 2\pi FT$, such that $c^2 + d^2 \geq 1$, an initial value e of a sine wave, and an initial value f of a cosine wave corresponding to said sine wave, wherein T is a period of time less than 1/2F seconds, and for generating electrical signals c, d, e, f representing said values c, d, e, and f, respectively;

calculating means connected to said initialization means and responsive to said signals c, d, e, and f for storing said values and for calculating every T seconds a value $S' = cf + de$, and a value $C' = df - ce$, for generating a value C and a value S by limiting to one any magnitude of C' and S' which exceeds one, and for generating a C signal and an S signal representing said values of C and S respectively; and feedback means connected to said calculating means and responsive to said C and S signals for returning said C and S signals to said calculating means prior to the beginning of the next calculation by said calculating means;

said calculating means responsive to said C and S signals returned by said feedback means to substitute the values represented by said returned C and S signals for said stored values e and f, respectively;

whereby said signal representing the value of S is the signal representing the consecutive sample digital values to a sine wave of frequency F.

11. An oscillator for generating an analog signal representing a sine wave of frequency F, comprising:

initialization means for deriving values $c = \sin 2\pi FT$, $d = \cos 2\pi FT$, such that $c^2 + d^2 \geq 1$, an initial value e of a sine wave, and an initial value f of a cosine wave corresponding to said sine wave, wherein T is a period of time less than 1/2F seconds and for generating electrical signals c, d, e, f representing said values c, d, e, and f, respectively;

calculating means connected to said initialization means and responsive to said signals c, d, e, and f for storing said values and for calculating every T seconds a value $S'=cf+de$, and a value $C'=df-ce$, for generating a value C and a value S by limiting to one any magnitude of $C'$ and $S'$ which exceeds one, and for generating a C signal and an S signal representing said values of C and S respectively;

feedback means connected to said calculating means and responsive to said C and S signals for returning said C and S signals to said calculating means prior to the beginning of the next calculation by said calculating means;

said calculating means responsive to said signals C and S returned by said feedback means to substitute the values represented by said returned signals C and S for said stored values e and f, respectively; and digital to analog converter means responsive to said S signal for generating an analog signal representing a sine wave of frequency F.

12. A digital sine wave oscillator for generating a signal representing the consecutive sample digital values of a sine wave of frequency F, the period between consecutive sample values being T seconds where T is less than 1/2F, comprising:

digital signal processing means operative under program control for deriving initial values $c=\sin 2\pi FT$, $d=\cos 2\pi FT$, such that $c^2+d^2 \geq 1$, an initial value e of a sine wave and an initial value f of the value of a cosine wave corresponding to said sine wave; for calculating every T seconds a preliminary next value $S'$ of said sine wave by calculating $cf+de=S'$, and a preliminary next value $C'$, corresponding to $S'$, by calculating $df-ce=C'$, for calculating a final next value of said cosine and sine waves, C and S, respectively by limiting to one any magnitude of $C'$ and $S'$ which exceeds one, for generating an output signal representing the value of S, and for substituting the values of S and C for the values of e and f prior to the next calculations of S and C.

13. An oscillator for generating an analog signal representing a sine wave of frequency F, comprising:

digital signal processing means operative under program control for deriving initial values $c=\sin 2\pi FT$, $d=\cos 2\pi FT$, such that $c^2+d^2 \geq 1$, an initial value e of a sine wave and an initial value f of the value of a cosine wave corresponding to said sine wave; for calculating every T seconds a preliminary next value $S'$ of said sine wave by calculating $cf+de=S'$, and a preliminary next value $C'$, corresponding to $S'$, by calculating $df-ce=C'$, for calculating a final next value of said cosine and sine waves, C and S, respectively by limiting to one any magnitude of $C'$ and $S'$ which exceeds one, for generating a signal representing the value of S, and for substituting the values of S and C for the values of e and f prior to the next calculations of S and C; and digital to analog converter means responsive to said signal representing the value of S for generating said analog signal representing a sine wave of frequency F.

* * * * *

UNITED STATES PATENT AND TRADEMARK OFFICE
CERTIFICATE OF CORRECTION

PATENT NO. : 4,577,287

DATED : March 18, 1986

INVENTOR(S) : Christopher J. Chrin

It is certified that error appears in the above-identified patent and that said Letters Patent is hereby corrected as shown below:

Column 3, line 26, change "$1+[1-\cos^2 (a+b)2-\sin^2 (a+b)]/2$" to --$1+[1-\cos^2 (a+b)-\sin^2 (a+b)]/2$--.

Column 6, claim 3, line 54, change "to" to --and--.

Column 8, claim 9, line 25, after "input", insert --and an output--.

Column 8, claim 10, line 62, change "to" to --of--.

Signed and Sealed this

Nineteenth Day of August 1986

[SEAL]

Attest:

DONALD J. QUIGG

Attesting Officer

Commissioner of Patents and Trademarks